United States Patent [19]

Torii et al.

[11] Patent Number: 5,559,070
[45] Date of Patent: Sep. 24, 1996

[54] SYNTHETIC INORGANIC POROUS MATERIAL AND METHOD FOR THE PREPARATION THEREOF

[75] Inventors: Kazuo Torii, Sendai; Takashi Iwasaki, Tagajo; Yoshio Onodera; Hiromichi Hayashi, both of Sendai, all of Japan

[73] Assignee: Director General of Agency of Industrial Science and Technology, Japan

[21] Appl. No.: 319,573

[22] Filed: Oct. 7, 1994

[51] Int. Cl.$^6$ .................................................. B01J 21/08
[52] U.S. Cl. .......................... 502/240; 502/250; 502/257; 423/326
[58] Field of Search .................................. 502/240, 250, 502/257, 259, 260, 244, 251; 423/330.1, 326

[56] References Cited

U.S. PATENT DOCUMENTS

| | | | |
|---|---|---|---|
| 4,732,747 | 3/1988 | Garces | 502/251 |
| 4,749,676 | 6/1988 | Blumenthal et al. | 502/251 |
| 5,133,951 | 7/1992 | Occelli | 423/326 |
| 5,219,813 | 6/1993 | Kumar et al. | 423/330.1 |

Primary Examiner—Glenn A. Caldarola
Attorney, Agent, or Firm—Wenderoth, Lind & Ponack

[57] ABSTRACT

Proposed is a novel synthetic inorganic porous material having a chemical composition of the general formula $$[(SiO_2)_8 \cdot (MO_{2/3})_a \cdot (OH)_{\frac{2}{3}a+b}]^{b-} \cdot b/c(A^{c+}),$$

in which M is an ion of a divalent metal, e.g., Mg, A is a cation of an alkali metal, alkaline earth metal, hydrogen or ammonium, the subscript a is a positive number of 3 to 10, b is a positive number of 0.1 to 1 and c is a positive number of 1 to 2, and characterized by a specific surface area of 100 to 800 m$^2$/g, average pore diameter of 2 to 8 nm, pore volume of 0.1 to 0.8 cm$^3$/g and cation exchange capacity of 0.1 to 1.2 meq/g. This porous material is prepared by a method comprising the steps of: (a) mixing an aqueous solution of sodium silicate and an aqueous solution of a water-soluble salt of a divalent metal M, e.g., magnesium, to form hydrous oxides; (b) separating the hydrous oxides from the precipitation medium; (c) subjecting an aqueous slurry of the hydrous oxides to a hydrothermal reaction at a temperature of from 100° to 300° C.; and (d) drying and heating the hydrothermally obtained product at a temperature of from 100° to 1000° C. to effect dehydration.

9 Claims, No Drawings

SYNTHETIC INORGANIC POROUS MATERIAL AND METHOD FOR THE PREPARATION THEREOF

BACKGROUND OF THE INVENTION

The present invention relates to a novel synthetic inorganic porous material and a method for the preparation thereof. More particularly, the invention relates to a synthetic inorganic porous material having a very large specific surface area, of which the pores have a diameter in the mesopore region with an outstandingly uniform distribution of the pore diameter as well as to a method for the preparation thereof.

Inorganic porous materials of which the pores have a diameter of 2 nm to 50 nm in the so-called mesopore region are promising as a material for which applications are now under development in the isolation or separation technology of various physiologically active substances such as vitamins and enzymes, as a catalyst in synthetic chemical processes and so on. Conventional inorganic porous materials used in these applications, such as zeolites heretofore obtained, however, have pores of which the pore diameter is about 0.9 nm at the largest. Other porous materials such as silica gel, γ-alumina, active charcoal and the like have pores in the mesopore region of the pore diameter but the distribution of their pore diameter ranges so widely from 1 nm to 100 nm that they can hardly be used in a precision material-separation process or as a size-selective catalyst.

Recently, an attempt is made for the utilization of a porous material by intercalation in an application as a catalyst. An alumina-crosslinked smectite as an intercalation porous material having a specific surface area of 228 m²/g suitable for use in the above mentioned applications is proposed in Journal of Chemical Society Communications, 1986, pages 1074–1076, according to which polyvalent cations of aluminum hydroxide are introduced between layers of smectite as an expandable layered silicate or a synthetic layer compound having a structure resembling that of smectite by cation exchange followed by a heat treatment to effect dehydration of the aluminum hydroxide forming pillars of alumina.

The porous materials obtained in this manner, however, have several problems and disadvantages. For example, the process for the synthetic preparation thereof is very complicated taking an unduly long time with poor reproducibility relative to the preparation of the aluminum hydroxide solution to be introduced between layers and the reaction of the aluminum hydroxide with smectite. The pore diameter thereof is about 0.9 nm to be close to that of faujasite zeolites so that their application fields are necessarily limited to those to which the above mentioned conventional zeolites are applicable.

Besides, the inventors have recently proposed, in Japanese Patent Kokai No. 6-48722, a porous material obtained by conducting a hydrothermal reaction of a hydrous oxide having a chemical composition of smectite and a cationic organic compound and drying and heating the thus obtained reaction product at a temperature of 100° to 1000° C. Though having a narrow distribution of the pore diameter in the mesopore region, this porous material is disadvantageous in respect of the large manufacturing cost because the expensive cationic organic compound combined with the hydrous oxide is necessarily lost in the course of the process by the thermal decomposition at such a high temperature.

SUMMARY OF THE INVENTION

The present invention accordingly has an object, by overcoming the above described problems and disadvantages of the conventional synthetic inorganic porous materials, to provide a highly heat-resistant synthetic inorganic porous material having a large specific surface area and a narrow distribution of pore diameter in the mesopore region as well as a method for the preparation thereof.

Thus, the present invention provides a synthetic inorganic porous material having a chemical composition represented by the general formula $$[(SiO_2)_8 \cdot (MO_{2/3})_a \cdot (OH)_{2/3a+b}]^{b-} \cdot b/c(A^{c+}), \tag{I}$$

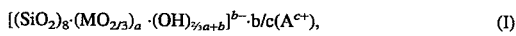

in which M is an ion of a divalent metal, A is a cation selected from the group consisting of an ion of an alkali metal, ion of an alkaline earth metal, hydrogen ion and ammonium ion, the subscript a is a positive number in the range from 3 to 10, the subscript b is a positive number in the range from 0.1 to 1 and the subscript c is a positive number in the range from 1 to 2.

The synthetic inorganic porous material of the invention defined above is characterized by a specific surface area in the range from 100 to 800 m²/g, average pore diameter in the range from 2 to 8 nm, pore volume in the range from 0.1 to 0.8 cm³/g and cation exchange capacity in the range from 0.1 to 1.2 meq/g.

The above defined and characterized synthetic inorganic porous material is prepared by a method comprising the steps of:

(a) mixing a first aqueous solution containing sodium silicate and a second aqueous solution containing a water-soluble salt of a divalent metal denoted by M to form precipitates of hydrous oxides in the precipitation medium;

(b) separating the precipitates of the hydrous oxides from the precipitation medium;

(c) subjecting an aqueous slurry containing the hydrous oxides to a hydrothermal reaction at a temperature in the range from 100° to 300° C. or, preferably, from 100° to 250° C.; and (d) drying and heating the product obtained by the hydrothermal reaction at a temperature in the range from 100° to 1000° C. or, preferably, from 200° to 800° C. to effect dehydration.

DETAILED DESCRIPTION OF THE PREFERRED EMBODIMENTS

The synthetic inorganic porous material of the invention has a chemical composition represented by the above given general formula (I). In the formula, M is an ion of a divalent metal selected from the group consisting of magnesium, cobalt, nickel, zinc, copper, iron, manganese, lead and cadmium though not particularly limitative thereto. Further, A in the general formula (I) is an ion selected from the group consisting of hydrogen ion, ammonium ion and ions of an alkali metal such as lithium, sodium and potassium and alkaline earth metal such as calcium, magnesium and strontium. Each of the subscripts a, b and c in the general formula (I) is a positive number in the range defined above.

The above defined synthetic inorganic porous material can be prepared by the method comprising the steps including step (a) for the preparation of hydrous oxides by the reaction of sodium silicate and a water-soluble salt of the divalent metal denoted by M in an aqueous precipitation medium, step (b) for the separation of the hydrous oxides from the precipitation medium to be freed from the solutes contained therein, step (c) for the hydrothermal reaction of the hydrous oxides in an aqueous slurry at a specified temperature and step (d) for drying and a heat treatment at a specified temperature to effect dehydration of the product obtained by the hydrothermal reaction.

When adequately prepared in the process described above, a synthetic inorganic porous material having the above defined chemical composition, which is characterized by a specific surface area in the range from 100 to 800 $m^2/g$, average pore diameter in the range from 2 to 8 nm, pore volume in the range from 0.1 to 0.8 $cm^3/g$ and cation exchange capacity in the range from 0.1 to 1.2 meq/g, can be obtained.

In step (a) of the inventive method, a first aqueous solution of sodium silicate and a second aqueous solution of a water-soluble salt of a divalent metal denoted by M are mixed together to form hydrous oxides in the precipitation medium. The sodium silicate can be so-called water glass of any grade specified, for example, in JIS or other authentic standards for water glass containing 28 to 38% by weight of $SiO_2$ and 9 to 19% by weight of $Na_2O$ or can be sodium metasilicate containing 19 to 29% by weight of $SiO_2$ and 20 to 30% by weight of $Na_2O$. The concentration of sodium silicate in the first solution is preferably in the range from 5 to 20% by weight calculated as $SiO_2$ though not particularly limitative thereto. If necessary, the first aqueous solution of sodium silicate can be admixed with other water-soluble alkaline compound such as sodium hydroxide, potassium hydroxide and ammonium hydroxide in order to adjust the pH value of the precipitation medium.

The second aqueous solution to be mixed with the above described first aqueous solution of sodium silicate is prepared by dissolving a salt of a divalent metal such as magnesium, cobalt, nickel, zinc, copper, iron, lead, cadmium, manganese and the like in water. The type of the salt is not particularly limitative provided that the salt is soluble in water including hydrochlorides, carbonates, nitrates, sulfates and the like. These metal salts can be used either singly or as a combination of two kinds or more according to the desired application of the synthetic inorganic porous material as the product. The concentration of the divalent metal salt in the second aqueous solution is preferably in the range from 0.5 to 3.0 moles/liter relative to the divalent metal ions.

When the first aqueous solution containing sodium silicate and the second aqueous solution containing a salt of a divalent metal are mixed together, precipitates of hydrous oxides are formed in the solution. The mixing ratio of the two solutions is selected depending on the molar ratio of 8:a giving the Si:M molar ratio according to the general formula (I), a and M each having the meaning defined for the general formula (I). The optimum value of pH of the precipitation medium, which should generally be in the range from 5.5 to 13, depends on the kind of the divalent metal M. For example, the pH of the precipitation medium should be in the range from 9 to 11 when the divalent metal M is magnesium and in the range from 6 to 11 when the divalent metal is nickel. It is optional, if necessary, to bring the pH to an optimum value by the addition of a pH-adjusting agent such as an alkali hydroxide. As a general trend, precipitation of the divalent metal oxide is incomplete when the pH value is too low while precipitation of silica would be incomplete when the pH value is too high.

The hydrous oxides obtained in the above described manner are then separated, in step (b), from the precipitation medium by a solid-liquid separation means such as decantation, filtration, centrifugation and the like and washed with water to be freed from the electrolyte solutes contained in the precipitation medium as completely as possible. Thereafter, water is added to the hydrous oxides to form an aqueous slurry which is subjected to a hydrothermal reaction in step (c). The amount of water added to the hydrous oxides is not particularly limitative but the solid content of the aqueous slurry is selected, preferably, in the range from 3 to 30% by weight.

An important role is played by the pH value of the aqueous slurry subjected to the hydrothermal reaction because the characteristics of the inventive synthetic inorganic porous material are greatly influenced by the pH value of the aqueous slurry. Namely, the pH value of the aqueous slurry should preferably be in the range from 6 to 12. As a trend, a low pH value has an effect to increase the average pore diameter and pore volume and to decrease the cation exchange capacity and a high pH value of the aqueous slurry has an effect to decrease the pore volume and to increase the cation exchange capacity. If necessary, the aqueous slurry can be admixed with an alkaline hydroxide such as sodium hydroxide, potassium hydroxide and ammonium hydroxide in order to adjust the pH value thereof within the desired range.

It is presumable that the inventive porous material is imparted with a capacity of cation exchange since the silicate skeleton constituting the inventive porous material is negatively charged. The quantity of the negative charge on the skeleton can be correlated with the value of the subscript b in the general formula (I) and hence with the cation exchange capacity. The quantity of the negative charge on the skeleton influences the surface properties of the porous material and consequently affects the adsorption behavior or the catalytic activity of the porous material.

The hydrothermal reaction of the hydrous oxides in an aqueous slurry in step (c) of the inventive method is carried out at a temperature in the range from 100° to 300° or, preferably, from 100° to 250°. The hydrothermal reaction in this temperature range is conducted for at least 1 hour but is complete within 24 hours or, in most cases, within 5 hours. The temperature of the hydrothermal reaction has an influence on the properties of the synthetic porous material as the product of the inventive method. As a trend, namely, the cation exchange capacity of the porous material is increased and the specific surface area of the material is decreased by increasing the temperature of the hydrothermal reaction. When the hydrothermal reaction of the hydrous oxides is conducted at a temperature exceeding 100° C., it is of course necessary to use a pressure-resistant reaction vessel, e.g., autoclave, for the reaction while the hydrothermal reaction can be performed at 100° C. by merely boiling an aqueous slurry of the hydrous oxides in an open vessel.

The product obtained by the hydrothermal reaction in step (c) of the inventive method is then dried and subjected to a heat treatment in step (d) to effect dehydration. Though not essential, it is optional to wash the hydrothermally obtained product with deionized water prior to drying. The process of drying can be conventional by using an ordinary drying oven or a vacuum drying oven at a temperature up to 200° C. If adequate, the method of freeze-drying is also applicable. The hydrothermally obtained product may sometimes cause caking by this drying so that it is optional to disintegrate or pulverize the caked product into fine discrete particles according to need before the heat treatment for dehydration is undertaken.

The heat treatment of the dried product obtained in the hydrothermal reaction is carried out at a temperature in the range from 100° to 1000° C. or, preferably, in the range from 200° to 800° C. in an electric furnace. The heat treatment is complete usually within 1 hour to give a desired synthetic inorganic porous material. The heat treatment can be performed preferably in an atmosphere of air but it is also adequate to conduct the heat treatment in an atmosphere of nitrogen, argon, hydrogen, oxygen and the like or in vacuum.

The synthetic inorganic porous material thus prepared can be identified and evaluated by undertaking chemical analysis, X-ray diffractometry, infrared absorption spectrophotometry and measurements of specific surface area, pore diameter distribution, cation exchange capacity and other parameters.

For example, X-ray diffractometry is useful for the identification of the crystalline phase or phases formed in the porous material. When an X-ray diffraction pattern is taken with the CuKa radiation from an X-ray tube with a copper target and a nickel filter, three relatively broad characteristic diffraction bands are found in the diffraction pattern of the inventive porous material at about $2\theta=20°$, $35°$ and $60°$ while a very broad single diffraction band is found in the range of $2\theta=20°$ to $25°$ in the diffraction pattern of an amorphous porous material having the same chemical composition as the inventive one. The X-ray diffraction pattern of the inventive porous material having the above mentioned three diffraction bands resembles that of a smectite having about the same chemical composition. A difference in the diffraction pattern between smectite and the inventive porous material is that, while a diffraction band in the direction perpendicular to the plane of the layers, i.e. 001 reflection, is noted in the diffraction pattern of smectite, such a diffraction band is usually not found in the diffraction pattern of the inventive porous material rarely with appearance of a broad and weak band in the range from $2\theta=2°$ to $6°$. This fact indicates that the synthetic inorganic porous material of the invention has a structure resembling that of a smectite with low crystallinity. Such a crystalline diffraction pattern can be retained up to a temperature of 600° to 750° C. of the heat treatment.

The performance of the synthetic inorganic porous material of the invention can be confirmed by means of the measurement of the specific surface area utilizing adsorption of nitrogen gas according to the so-called BET method or the pore diameter distribution determined from the adsorption and desorption isotherms of nitrogen gas. Following are the advantages obtained with the synthetic inorganic porous material of the invention.

(1) Different from conventional porous materials, the inventive porous material having a low-crystalline structure is an aggregation of fine platelet-like particles and the negative charge on the surface thereof is controllable so that metallic ions can be easily absorbed to exhibit usefulness as a support of catalysts.

(2) The manufacturing process thereof is simple and efficient as compared with conventional porous materials.

(3) The porous material has a narrow pore diameter distribution ranging from about 2 nm to about 8 nm and a large pore volume of about 0.1 to 0.8 cm$^3$/g so that it is useful as a separation material and adsorbent for various kinds of organic molecules including physiologically active substances such as vitamins, enzymes and the like.

(4) Ions of a divalent heavy metal such as nickel can be included in the inventive porous material so that it is useful as a filter or adsorbent to exhibit effectiveness as a bactericidal agent, antibacterial agent or disinfecting agent.

(5) The porous material can be used as a heat-insulating material or as a carrier for a sustained-release agent by utilizing the porous structure and can be used as a filler or as a resin stabilizer by utilizing the bulkiness.

(6) The porous material can be used as a deodorant or as an ethylene adsorbent for freshness preservation of fruits by utilizing the porous structure so that usefulness thereof can be found in refrigerators, toilets, insoles and the like.

In the following, examples are given to more fully illustrate the synthetic inorganic porous material of the invention as well as the method for the preparation thereof.

EXAMPLE 1

An aqueous sodium silicate solution having a pH of 13.6, referred to as the solution A hereinafter, was prepared by dissolving, in 200 ml of water taken in a beaker of 1 liter capacity, 86 g of a water glass containing 28% by weight of $SiO_2$ and 9% by weight of $Na_2O$ with a molar ratio $SiO_2:Na_2O$ of 3.22 with addition of 150 ml of a 2N aqueous solution of sodium hydroxide. Separately, another aqueous solution having a pH of 4.0, referred to as the solution B hereinafter, was prepared by dissolving 61.0 g of magnesium chloride hexahydrate of reagent grade having a purity of 98% in 200 ml of water.

In the next place, the above prepared solution B was added dropwise into the solution A over a period of 5 minutes under stirring followed by further continued stirring for 1 hour so that precipitates were formed in the solution. The thus formed Si-Mg hydrous oxide was collected by filtration and thoroughly washed with water followed by the addition of 20 ml of water to make an aqueous slurry. The aqueous slurry was transferred into an autoclave of 1 liter capacity and subjected therein to a hydrothermal reaction for 2 hours at 200° C. under a pressure of 1.66 MPa. The pH value of the aqueous slurry, which was 10.1 before the hydrothermal reaction, dropped to 9.3 after the reaction. After cooling, the reaction product in the autoclave was taken out and, after drying, subjected to a heat treatment in an electric furnace at a temperature of 300° C. for 1 hour.

The thus obtained reaction product had a chemical composition of the formula $(SiO_2)_8(MgO)_{6.13}(OH)_{4.34}(Na_2O)_{0.19}$ corresponding to the general formula (I) in which $a=6.13$ and $b=0.25$. The product had a porous structure as was indicated by the specific surface area of 485 m$^2$/g as determined by the nitrogen adsorption at $-196°$ C., pore volume of 0.396 cm$^3$/g and average pore diameter of 3.27 nm. The cation exchange capacity thereof was 0.28 meq/g.

EXAMPLE 2

The experimental procedure for the preparation of a synthetic inorganic porous material was substantially the same as in Example 1 except that the hydrothermal reaction was performed at 150° C. under a pressure of 0.59 MPa.

The thus obtained reaction product had a chemical composition of the formula $(SiO_2)_8(MgO)_{6.21}(OH)_{4.81}(Na_2O)_{0.21}$ corresponding to the general formula (I) in which $a=6.21$ and $b=0.17$. The product after the heat treatment at 300° C. for 1 hour had a specific surface area of 679 m$^2$/g, pore volume of 0.481 cm$^3$/g and average pore diameter of 2.83 nm. The cation exchange capacity thereof was 0.20 meq/g.

EXAMPLE 3

The experimental procedure for the preparation of a synthetic inorganic porous material was substantially the same as in Example 1 except that the hydrothermal reaction was performed at 250° C. under a pressure of 4.12 MPa.

The thus obtained reaction product had a composition of the formula $(SiO_2)_8(MgO)_{6.42}(OH)4.72(Na_2O)_{0.16}$ corresponding to the general formula (I) in which a=6.42 and b=0.44. The product after the heat treatment at 300° C. for 1 hour had a specific surface area of 370 m²/g, pore volume of 0.356 cm³/g and average pore diameter of 3.85 nm. The cation exchange capacity thereof was 0.46 meq/g.

EXAMPLE 4

The experimental procedure for the preparation of a synthetic inorganic porous material was substantially the same as in Example I except that the aqueous slurry before the hydrothermal reaction was admixed with 20 ml of an aqueous solution containing 1.44 g of sodium hydroxide.

The thus obtained reaction product had a chemical composition of the formula $(SiO_2)_8(MgO)_{6.31}(OH)_{5.07}(Na_2O)_{0.37}$ corresponding to the general formula (I) in which a=6.31 and b=0.86. The product after the heat treatment at 300° C. for 1 hour had a specific surface area of 427 m²/g, pore volume of 0.264 cm³/g and average pore diameter of 2.47 nm. The cation exchange capacity thereof was 0.92 meq/g.

EXAMPLE 5

The experimental procedure for the preparation of a synthetic inorganic porous material was substantially the same as in Example 2 except that the volume of the 2N aqueous solution of sodium hydroxide added to the solution A was increased from 150 ml to 200 ml.

The thus obtained reaction product had a chemical composition of the formula $(SiO_2)_8(MgO)_{6.78}(OH)_{4.88}(Na_2O)_{0.48}$ corresponding to the general formula (I) in which a=6.78 and b=0.36. The product after the heat treatment at 300° C. for 1 hour had a specific surface area of 448 m²/g, pore volume of 0.263 cm³/g and average pore diameter of 2.35 nm. The cation exchange capacity thereof was 0.36 meq/g.

EXAMPLE 6

The experimental procedure for the preparation of a synthetic inorganic porous material was substantially the same as in Example 1 except that the solution A was prepared from 86 g of the same water glass, 200 ml of the 2N aqueous solution of sodium hydroxide and 200 ml of water and the solution B was prepared by dissolving 71.3 g of nickel chloride hexahydrate of reagent grade in 200 ml of water.

The thus obtained reaction product had a chemical composition of the formula $(SiO_2)_8(NiO)_{5.90}(OH)4.67(Na_2O)_{0.70}$ corresponding to the general formula (I) in which a=5.90 and b=0.74. The product after the heat treatment at 300° C. for 1 hour had a specific surface area of 400 m²/g, pore volume of 0.239 cm³/g and average pore diameter of 2.39 nm. The cation exchange capacity thereof was 0.64 meq/g.

EXAMPLE 7

The experimental procedure for the preparation of a synthetic inorganic porous material was substantially the same as in Example 6 except that the volume of the 2N aqueous solution of sodium hydroxide used in the preparation of the solution A was decreased from 200 ml to 150 ml.

The thus obtained reaction product had a chemical composition of the formula $(SiO_2)_8(NiO)_{5.75}(OH)_{4.04}(Na_2O)_{0.07}$ corresponding to the general formula (I) in which a=5.75 and b=0.21. The product after the heat treatment at 300° C. for 1 hour had a specific surface area of 429 m²/g, pore volume of 0.382 cm³/g and average pore diameter of 3.56 nm. The cation exchange capacity thereof was 0.20 meq/g.

EXAMPLE 8

The experimental procedure for the preparation of a synthetic inorganic porous material was substantially the same as in Example 1 except that the solution A was prepared from 86 g of the same water glass, 150 ml of the 2N aqueous solution of sodium hydroxide and 200 ml of water and the solution B was prepared by dissolving 71.4 g of cobalt chloride hexahydrate of reagent grade in 200 ml of water.

The thus obtained reaction product had a chemical composition of the formula $(SiO_2)_8(NiO)_{5.98}(OH)_{4.13}(Na_2O)_{0.11}$ corresponding to the general formula (I) in which a=5.98 and b=0.14. The product after the heat treatment at 300° C. for 1 hour had a specific surface area of 380 m²/g, pore volume of 0.338 cm³/g and average pore diameter of 3.56 nm. The cation exchange capacity thereof was 0.14 meq/g.

What is claimed is:

1. A synthetic inorganic porous material having a chemical composition represented by the formula

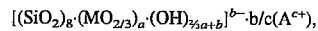

$$[(SiO_2)_8 \cdot (MO_{2/3})_a \cdot (OH)_{\frac{2}{3}a+b}]^{b-} \cdot b/c(A^{c+}),$$

in which M is an ion of a divalent metal, A is a cation selected from the group consisting of an ion of an alkali metal, ion of an alkaline earth metal, hydrogen ion and ammonium ion, the subscript a is a positive number in the range from 3 to 10, the subscript b is a positive number in the range from 0.1 to 1 and the subscript c is a positive number in the range from 1 to 2, and which has a specific surface area in the range from 100° to 800° m²/g, average pore diameter in the range from 2 to 8 nm, pore volume in the range from 0.1 to 0.8 cm³/g and cation exchange capacity in the range from 0.1 to 1.2 meq/g.

2. The synthetic inorganic porous material as claimed in claim 1 in which M is an ion of a divalent metal selected from the group consisting of magnesium, cobalt, nickel, zinc, copper, iron, manganese, lead and cadmium.

3. A method for the preparation of a synthetic inorganic porous material having a chemical composition represented by the formula

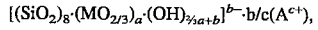

$$[(SiO_2)_8 \cdot (MO_{2/3})_a \cdot (OH)_{\frac{2}{3}a+b}]^{b-} \cdot b/c(A^{c+}),$$

in which M is an ion of a divalent metal, A is a cation selected from the group consisting of an ion of an alkali metal, ion of an alkaline earth metal, hydrogen ion and ammonium ion, the subscript a is a positive number in the range from 3 to 10, the subscript b is a positive number in the range from 0.1 to 1 and the subscript c is a positive number in the range from 1 to 2, and which has a specific surface area in the range from 100 to 800 m²/g, average pore diameter in the range from 2 to 8 nm, pore volume in the range from 0.1 to 0.8 cm³/g and cation exchange capacity in the range from 0.1 to 1.2 meq/g, which comprises the steps of:

(a) mixing a first aqueous solution containing sodium silicate and a second aqueous solution containing a water-soluble salt of a divalent metal denoted by M to precipitate hydrous oxides in the mixture of the solutions as a precipitation medium;

(b) separating the hydrous oxides from the precipitation medium;

(c) subjecting the hydrous oxides in an aqueous slurry to a hydrothermal reaction at a temperature in the range from 100° to 300° C.; and (d) drying and heating the product obtained by the hydrothermal reaction at a temperature in the range from 100° to 1000° C. to effect dehydration.

4. The method for the preparation of a synthetic inorganic porous material as claimed in claim 3 in which the first aqueous solution contains sodium silicate in a concentration in the range from 5 to 20% by weight calculated as $SiO_2$.

5. The method for the preparation of a synthetic inorganic porous material as claimed in claim 3 in which the second aqueous solution contains the water-soluble salt of a divalent metal in a concentration in the range from 0.5 to 3.0 moles/liter relative to the divalent metal ions.

6. The method for the preparation of a synthetic inorganic porous material as claimed in claim 3 in which the divalent metal is selected from the group consisting of magnesium, cobalt, nickel, zinc, copper, iron, manganese, lead and cadmium.

7. The method for the preparation of a synthetic inorganic porous material as claimed in claim 3 in which the temperature of the hydrothermal reaction is in the range from 100° to 250° C.

8. The method for the preparation of a synthetic inorganic porous material as claimed in claim 3 in which the hydrothermal reaction is performed for at least 1 hour.

9. The method for the preparation of a synthetic inorganic porous material as claimed in claim 3 in which the temperature of heating in step (d) is in the range from 200° to 800° C.

* * * * *

UNITED STATES PATENT AND TRADEMARK OFFICE
CERTIFICATE OF CORRECTION

PATENT NO. : 5,559,070
DATED : September 24, 1996
INVENTOR(S) : Kazuo TORII et al.

It is certified that error appears in the above-indentified patent and that said Letters Patent is hereby corrected as shown below:

Column 8, line 39, change "100° to 800° m²/g" to --100 to 800 m²/g--.

Signed and Sealed this

Twenty-second Day of April, 1997

*Attest:*

BRUCE LEHMAN

*Attesting Officer*

Commissioner of Patents and Trademarks

UNITED STATES PATENT AND TRADEMARK OFFICE
CERTIFICATE OF CORRECTION

PATENT NO. : 5,559,070
DATED : September 24, 1996
INVENTOR(S) : Kazuo TORII et al.

It is certified that error appears in the above-indentified patent and that said Letters Patent is hereby corrected as shown below:

On the title page, item [73], before "Director General insert --Japan as represented by--.

Signed and Sealed this

Twenty-eighth Day of October, 1997

*Attest:*

BRUCE LEHMAN

*Attesting Officer*  Commissioner of Patents and Trademarks